United States Patent [19]

Bauer et al.

[11] Patent Number: 5,062,719
[45] Date of Patent: Nov. 5, 1991

[54] ROLLER BEARING CAGE

[75] Inventors: Bernhard Bauer, Hassfurt; Heinz Reichle, Tuttlingen; Robert Stolz, Schweinfurt, all of Fed. Rep. of Germany

[73] Assignee: SKF GmbH, Schweinfurt, Fed. Rep. of Germany

[21] Appl. No.: 602,123

[22] Filed: Oct. 23, 1990

[30] Foreign Application Priority Data

Nov. 2, 1989 [DE] Fed. Rep. of Germany ....... 3936451

[51] Int. Cl.$^5$ .............................................. F16C 33/54
[52] U.S. Cl. .................................... 384/450; 384/575
[58] Field of Search ............... 384/575, 450, 572, 580, 384/533

[56] References Cited

U.S. PATENT DOCUMENTS 3,310,351 3/1967 Ortegren ......................... 384/575
3,482,891 12/1969 Evangelista et al. ............... 384/575
3,992,764 11/1976 Seraiso ............................. 384/575

FOREIGN PATENT DOCUMENTS 973310 12/1959 Fed. Rep. of Germany .

Primary Examiner—Lenard A. Footland
Attorney, Agent, or Firm—Rosen, Dainow & Jacobs

[57] ABSTRACT

A roller bearing cage is made of a bent strip of sheet metal having abutting ends that are connected to one another, the cage being comprised of two end rings and a cage frame surrounding the windows, the windows retaining and guiding the rollers. In order to permit the manufacture of rolling element bearing cages of different reference circle diameters while using only one tool for rolling elements with a specific diameter d, the center distance between adjacent the cage windows in the circumferential direction is $\pi d/2$.

2 Claims, 1 Drawing Sheet

ROLLER BEARING CAGE

FIELD OF THE INVENTION

The invention is directed to a rolling element bearing cage made of a bent strip of sheet metal whose abutting ends are connected to one another.

BACKGROUND OF THE INVENTION

DE-PS 973 310, for example, discloses a cage for rolling elements, such as a needle bearing cage. In order to manufacture cages of this type with different diameters it was necessary, until now, to use many tools with punching devices corresponding to the different center distances between the cage windows. These tools are very expensive so that it was neither cheap nor practical to manufacture cages in the aforementioned manner.

SUMMARY OF THE INVENTION

The object of the invention is to provide rolling element bearing cages of the kind discussed above, with different reference circle diameters for rolling bearing elements having one and the same outer diameter, in such a manner that only one tool is needed for manufacturing each of the cages.

According to the invention this object is achieved by providing a cage wherein the center distance between adjacent cage windows in a flat development of the cage section is $\pi d/2$, wherein d is the diameter of the rolling elements. This arrangement enables the manufacture of cages in a cheap and practical manner.

According to further features of the invention, when the length of the cage is an integral number of divisions, the cage windows adjacent the partition of the bent cage section have a center distance $\pi d$ from one another along the reference circle in a circumferential direction. If, however, the length of the cage is a nonintegral number of divisions, the cage windows adjacent the partition of the bent cage section have a center distance from one another along the reference circle, in a circumferential direction, which is less than $\pi d$ and which is complementary to the size of the reference circle. As a result it is possible to manufacture cages whose number of divisions is not an integral number, without changing the center distance of the other cage windows.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
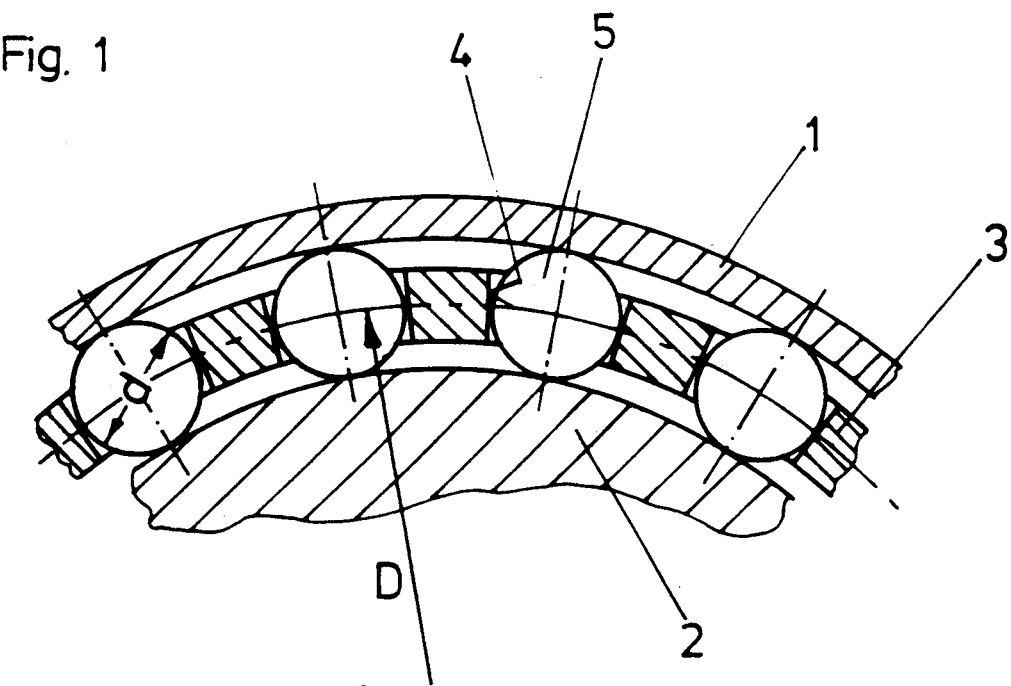
FIG. 1 is a cross sectional view of a portion of a cylindrical roller bearing employing a cage in accordance with the invention.

FIG. 1 illustrates a rolling element bearing having an outer ring 1, an inner ring 2, a cage 3 and cylindrical rollers 5. The rollers 5 have a diameter d and are positioned in windows 4 of the cage. The cage 3 according to the invention is manufactured from a strip of sheet metal, and the cage windows 4 are punched from the strip with a tool (not shown).

Figure 2:
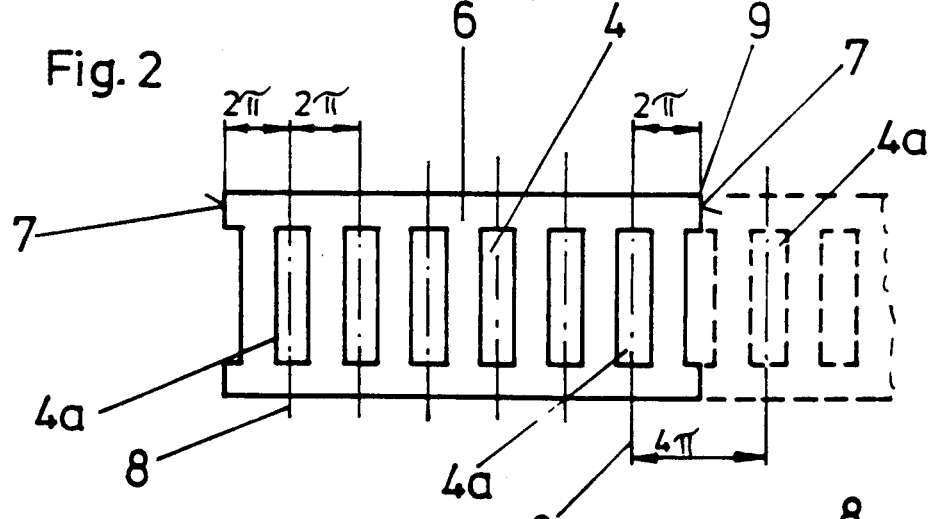
FIG. 2 is a developed view of the cage shown in FIG. 1 on a reduced scale.

FIG. 2 is a top view of a flat development of a section of cage 6, wherein the center distance between adjacent cage windows 4 is $\pi d/2$, in accordance with the invention. In one example of the invention, wherein the dimensions are in mm, the diameter d of the cylindrical rollers was 4 mm. The center distance between adjacent rollers is referred to herein as a "division". The use of a division of $\pi d/2$ has the advantage that it enables the use of the same tool for the manufacture of cages with various reference circle diameters D (i.e. the bearing diameter measured to the axes of the rollers 5). In accordance with the invention, a section of a strip from which cage windows have been punched is cut to provide a section of the desired length, the thus cut section is bent, and the abutting ends of the cut and bent section are welded together. In the embodiment shown in FIG. 2 wherein the diameter of the rollers is 4 mm, the abutting ends 7 are spaced on both front sides of the cage section 6 at a distance $2\pi$ from the median lines 8 of the adjacent cage windows 4a, and extend in an axial direction of the bearing. As a result, the median lines 8 of the cage windows 4a adjacent to the partition 9 of the bent cage section 6 are spaced a center distance $4\pi$ from one another along the reference circle in a circumferential direction. The cage section shown in FIG. 2 can be used for cages with an integral number of divisions. The number z of divisions can be derived from the formula:

$$z = 2D/d.$$

Figure 3:
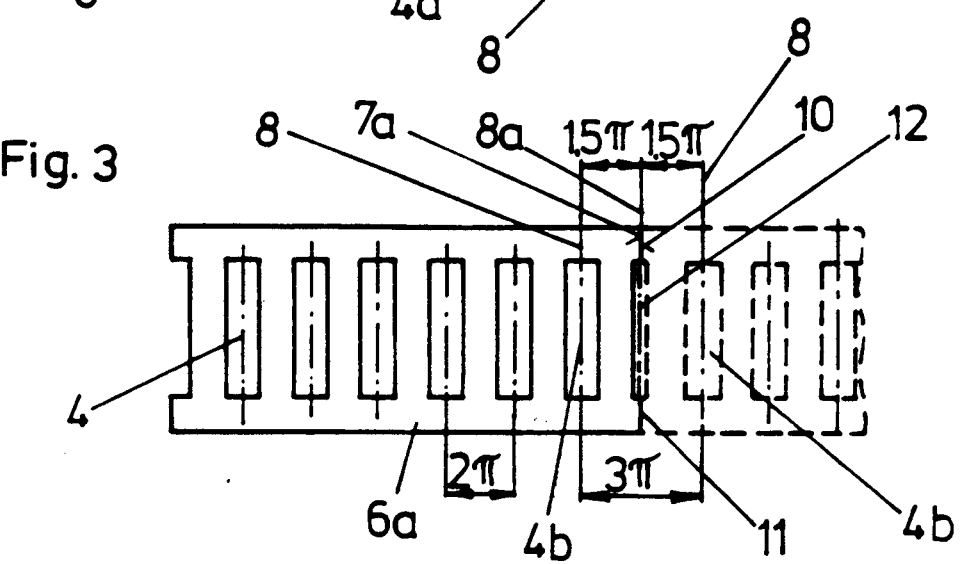
FIG. 3 is a further example of a cage according to the invention.

For cages having a number of divisions which is not an integral number, and a cylindrical roller with a diameter of 4 mm, the embodiment of the invention illustrated in FIG. 3 is appropriate. In this embodiment, the plane 10 at the abutment between the ends of the bearing is spaced on one side of the cage section 6a a distance of $1.5\pi$, and the other abutting line 7a is also spaced a distance of $1.5\pi$ from the median line 8 of the adjacent cage window 4b, so that the partition 11 of the bent cage section 6a, along the median line 8a, results in a window 12 having a dimension in the circumferential direction that is reduced by $\pi$, and that between the median lines of the adjacent cage windows 4b there is a median distance of $3\pi$. When, for a specific reference circle diameter D and a selected roller diameter d, the number of divisions is not an integral number, it is generally true that the cage windows 4b adjacent to the partition of the bent cage section must be spaced, along the reference circle in a circumferential direction, at a median distance from one another which is less than $\pi d$, and complementary to the size of the reference circle, whereby the abutting ends 7a, 10 are preferably spaced the same distance from the median line 8 of the respective adjacent cage windows 4b.

The dotted lines in FIGS. 2 and 3 show how the other side of the cage section 6, 6a, joins the abutting ends 7 or 10 after bending.

The invention is not limited to the above describe example of the invention. Changes in the design of the individual components are possible without departing from the invention. For example only, the abutting ends of the cage may be along one or more lines extending diagonally across the strip.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. In a rolling element bearing cage assembly including a cage made of a bent strip of sheet metal having abutting ends connected to one another, wherein the cage is comprised of two end rings and a cage frame surrounding a plurality of windows, said windows retaining and guiding rolling elements, the improvement wherein the center distance of the cage windows in a flat development of the cage section is $\pi d/2$, in which d is the diameter of the rolling elements.

2. The rolling element bearing cage assembly of claim 1, wherein the cage windows adjacent to the partition of the bent cage section are spaced a center distance of $d\pi$ from one another, at the level of the reference circle extending through the centers of the rolling elements in a circumferential direction.

* * * * *